United States Patent
Oestreicher et al.

(10) Patent No.: US 6,577,808 B1
(45) Date of Patent: Jun. 10, 2003

(54) RECORDING DEVICE HAVING DETECTION MEANS FOR DETECTING ADDITIONAL INFORMATION IN RECEPTION DATA AND FOR RECORDING THE ADDITIONAL INFORMATION IN A POSITIONALLY FIXED AREA IN A RECORDING TRACK

(75) Inventors: Ralf Oestreicher, Vienna (AT); Adolf Proidl, Vienna (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/342,835

(22) Filed: Jun. 29, 1999

(30) Foreign Application Priority Data

Jun. 30, 1998 (EP) ............................. 98890187

(51) Int. Cl.[7] ................................. H04N 5/91
(52) U.S. Cl. ............................. 386/68; 386/83; 386/95
(58) Field of Search ................. 386/83, 95, 124, 386/68, 46, 96, 81, 69, 70; H04N 5/91

(56) References Cited

U.S. PATENT DOCUMENTS

| | | | | |
|---|---|---|---|---|
| 5,293,357 A | * | 3/1994 | Hallenbeck | 386/83 |
| 5,488,409 A | * | 1/1996 | Yuen et al. | 386/83 |
| 6,246,828 B1 | * | 6/2001 | Van Husen | 386/68 |
| 6,317,556 B1 | * | 11/2001 | Rijckaert | 386/68 |

FOREIGN PATENT DOCUMENTS

| EP | 0668697 A2 | 8/1995 | ............ G04N/5/926 |
|---|---|---|---|
| WO | WO9834225 | 8/1998 | ............ G11B/20/12 |

OTHER PUBLICATIONS

Digital Video Broadcasting (DVB) Standard, EN 300 468 Feb., 1998.

D–VHS System Standard, Jul., 2000 A & B.

D–VHS DF–480 Cassette Guideline, Sep., 2000.

* cited by examiner

*Primary Examiner*—Vincent Boccio
(74) *Attorney, Agent, or Firm*—Edward W. Goodman

(57) ABSTRACT

A recording device (1) includes a receiver (2) for receiving digital reception data (E) which contain picture, sound and additional information, a processor (3) for processing received reception data (E) and for supplying digital recording data (AD), a part of the recording data (AD) being formed by information data (ID) which contain additional information, and a recording unit (4) which includes at least two magnetic heads (A, B), mounted on a rotatably-supported head disc (14), for the recording of recording data (AD) in helical recording tracks (S) on a magnetic tape (12). The recording device now further includes a detection unit (31) for detecting additional information contained in reception data (E) and for supplying received detected additional information, and an additional information processor (33) for processing received detected additional information (ZT, ZU) and for supplying information data (ID), the recording unit (4) being adapted to record the information data (ID) supplied by the additional information processor (33) in an information data recording area (SC) which is always the same as regards its position in a helical recording track (S).

9 Claims, 4 Drawing Sheets

FIG.3A

| S | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| H | A | B | A | B | A | B | A | B | A | B | A | B | A | B | A | B | A | B | A | B | A | B | A | B |
| AT| 1 | 2 | 3 | 4 | 5 | 6 | 7 | 8 | 9 | 10| 11| 1 | 2 | 3 | 4 | 5 | 6 | 7 | 8 | 9 | 10| 11| 1 | 2 |
| x1| A | B | A | B | A | B | A | B | A | B | A | B | A | B | A | B | A | B | A | B | A | B | A | B |
| x2| A |   |   | B |   | A |   | B |   | A |   | B | A |   | B |   | A |   | B |   | A |   | B |   |
| x3| A |   |   | B |   |   | A |   |   | B |   |   | A |   |   | B |   |   | A |   |   | B |   |   |
| x6| A |   |   |   |   |   | B |   |   |   |   |   | A |   |   |   |   |   | B |   |   |   |   |   |

(K spans columns 1–12; N spans columns 1–12)

FIG.3B

| S | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 |
|---|---|---|---|---|---|---|---|---|---|---|---|---|---|---|---|---|---|---|---|---|---|---|---|---|
| H | A | B | A | B | A | B | A | B | A | B | A | B | A | B | A | B | A | B | A | B | A | B | A | B |
| AT| 3 | 4 | 5 | 6 | 7 | 8 | 9 | 10| 11| 1 | 2 | 3 | 4 | 5 | 6 | 7 | 8 | 9 | 10| 11| 1 | 2 | 3 | 4 |
| x1| A | B | A | B | A | B | A | B | A | B | A | B | A | B | A | B | A | B | A | B | A | B | A | B |
| x2| A |   |   | B |   | A |   | B |   | A |   | B | A |   | B |   | A |   | B |   | A |   | B |   |
| x3| A |   |   | B |   |   | A |   |   | B |   |   | A |   |   | B |   |   | A |   |   | B |   |   |
| x6| A |   |   |   |   |   | B |   |   |   |   |   | A |   |   |   |   |   | B |   |   |   |   |   |

FIG.3C

| S | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 |
|---|---|---|---|---|---|---|---|---|---|---|---|---|---|---|---|---|---|---|---|---|---|---|---|---|
| H | A | B | A | B | A | B | A | B | A | B | A | B | A | B | A | B | A | B | A | B | A | B | A | B |
| AT| 5 | 6 | 7 | 8 | 9 | 10| 11| 1 | 2 | 3 | 4 | 5 | 6 | 7 | 8 | 9 | 10| 11| 1 | 2 | 3 | 4 | 5 | 6 |
| x1| A | B | A | B | A | B | A | B | A | B | A | B | A | B | A | B | A | B | A | B | A | B | A | B |
| x2| A |   |   | B |   | A |   | B |   | A |   | B | A |   | B |   | A |   | B |   | A |   | B |   |
| x3| A |   |   | B |   |   | A |   |   | B |   |   | A |   |   | B |   |   | A |   |   | B |   |   |
| x6| A |   |   |   |   |   | B |   |   |   |   |   | A |   |   |   |   |   | B |   |   |   |   |   |

FIG.3D

| S | 73 | 74 | 75 | 76 | 77 | 78 | 79 | 80 | 81 | 82 | 83 | 84 | 85 | 86 | 87 | 88 | 89 | 90 | 91 | 92 | 93 | 94 | 95 | 96 |
|---|---|---|---|---|---|---|---|---|---|---|---|---|---|---|---|---|---|---|---|---|---|---|---|---|
| H | A | B | A | B | A | B | A | B | A | B | A | B | A | B | A | B | A | B | A | B | A | B | A | B |
| AT| 7 | 8 | 9 | 10| 11| 1 | 2 | 3 | 4 | 5 | 6 | 7 | 8 | 9 | 10| 11| 1 | 2 | 3 | 4 | 5 | 6 | 7 | 8 |
| x1| A | B | A | B | A | B | A | B | A | B | A | B | A | B | A | B | A | B | A | B | A | B | A | B |
| x2| A |   |   | B |   | A |   | B |   | A |   | B | A |   | B |   | A |   | B |   | A |   | B |   |
| x3| A |   |   | B |   |   | A |   |   | B |   |   | A |   |   | B |   |   | A |   |   | B |   |   |
| x6| A |   |   |   |   |   | B |   |   |   |   |   | A |   |   |   |   |   | B |   |   |   |   |   |

| S  | 97 | 98 | 99 | 100 | 101 | 102 | 103 | 104 | 105 | 106 | 107 | 108 | 109 | 110 | 111 | 112 | 113 | 114 | 115 | 116 | 117 | 118 | 119 | 120 |
|----|----|----|----|-----|-----|-----|-----|-----|-----|-----|-----|-----|-----|-----|-----|-----|-----|-----|-----|-----|-----|-----|-----|-----|
| H  | A  | B  | A  | B   | A   | B   | A   | B   | A   | B   | A   | B   | A   | B   | A   | B   | A   | B   | A   | B   | A   | B   | A   | B   |
| AT | 9  | 10 | 11 | 1   | 2   | 3   | 4   | 5   | 6   | 7   | 8   | 9   | 10  | 11  | 1   | 2   | 3   | 4   | 5   | 6   | 7   | 8   | 9   | 10  |
| x1 | A  | B  | A  | B   | A   | B   | A   | B   | A   | B   | A   | B   | A   | B   | A   | B   | A   | B   | A   | B   | A   | B   | A   | B   |
| x2 | A  |    | B  |     | A   |     | B   |     | A   |     | B   |     | A   |     | B   |     | A   |     | B   |     | A   |     | B   |     |
| x3 | A  |    |    | B   |     |     | A   |     |     | B   |     |     | A   |     |     | B   |     |     | A   |     |     | B   |     |     |
| x6 | A  |    |    |     |     |     | B   |     |     |     |     |     | A   |     |     |     |     |     | B   |     |     |     |     |     |

FIG.3E  36

| S  | 121 | 122 | 123 | 124 | 125 | 126 | 127 | 128 | 129 | 130 | 131 | 132 | 133 | 134 | 135 | 136 | 137 | 138 | 139 | 140 | 141 | 142 | 143 | 144 |
|----|-----|-----|-----|-----|-----|-----|-----|-----|-----|-----|-----|-----|-----|-----|-----|-----|-----|-----|-----|-----|-----|-----|-----|-----|
| H  | A   | B   | A   | B   | A   | B   | A   | B   | A   | B   | A   | B   | A   | B   | A   | B   | A   | B   | A   | B   | A   | B   | A   | B   |
| AT | 11  | 1   | 2   | 3   | 4   | 5   | 6   | 7   | 8   | 9   | 10  | 11  | 12  | 13  | 14  | 15  | 16  | 17  | 18  | 19  | 20  | 21  | 22  | 23  |
| x1 | A   | B   | A   | B   | A   | B   | A   | B   | A   | B   | A   | B   | A   | B   | A   | B   | A   | B   | A   | B   | A   | B   | A   | B   |
| x2 | A   |     | B   |     | A   |     | B   |     | A   |     | B   |     | A   |     | B   |     | A   |     | B   |     | A   |     | B   |     |
| x3 | A   |     |     | B   |     |     | A   |     |     | B   |     |     | A   |     |     | B   |     |     | A   |     |     | B   |     |     |
| x6 | A   |     |     |     |     |     | B   |     |     |     |     |     | A   |     |     |     |     |     | B   |     |     |     |     |     |

FIG.3F  36

RECORDING DEVICE HAVING DETECTION MEANS FOR DETECTING ADDITIONAL INFORMATION IN RECEPTION DATA AND FOR RECORDING THE ADDITIONAL INFORMATION IN A POSITIONALLY FIXED AREA IN A RECORDING TRACK

BACKGROUND OF THE INVENTION

1. Field of the Invention

The invention relates to a recording device having receiving means for receiving digital reception data which contain picture, sound and additional information, and having processing means for processing received reception data and for supplying digital recording data, a part of the digital recording data being formed by information data which contain additional information, and having recording means which includes at least two magnetic heads, mounted on a rotatably-supported head disc, for the recording of recording data in helical recording tracks on a magnetic tape, information data being recordable in at least two recording areas which differ as regards their positions in a helical recording track.

2. Description of the Related Art

Such a recording device of the type defined in the opening paragraph is known from International Patent Application No. PCT/IB 98/00130, published as WO 98/34225 and corresponding to U.S. Pat. No. 6,317,556, and takes the form of a video recorder. The known video recorder has receiving means formed by an input connector for receiving an MPEG transport stream which includes digital reception data (Moving Picture Experts Group, ISO/IEC DIS 13818.1). An MPEG transport stream can contain parallel picture and sound information of, for example, six television programs in so-called MPEG transport stream packets. Moreover, an MPEG transport stream can contain additional information relating to these six television programs in further MPEG transport stream packets in accordance with the DVB standard (Digital Video Broadcasting, ETS 300468 of February, 1998). In accordance with the DVB standard, additional information is transmitted, for example, in a so-called Selection Information Table contained in MPEG transport stream packets. Additional information can be, for example, information that a television program can be displayed in the 16:9 display format or that sound information of a television program supports Surround Sound. However, additional information can also relate to a title or the content of a television program.

The known video recorder further comprises processing means for receiving an MPEG transport stream and for processing the MPEG transport stream into recording data which can be recorded on a magnetic tape in accordance with the DVHS standard (Victor Company of Japan, No. 07015 of Jul. 25, 1997). MPEG transport stream packets which contain a Selection Information Table then form part of the recording data.

The known video recorder has recording means which enables recording data, including picture, sound and additional information, to be recorded in helical recording tracks on a magnetic tape of a magnetic-tape cassette. For this purpose, the recording means comprises a scanner having a head disc on which two magnetic heads, a magnetic head A and a magnetic head B, are mounted so as to be rotationally drivable. Head gaps of the magnetic heads A and B have different azimuth angles in order to reduce crosstalk from recording data recorded in adjacent tracks during the reproduction of the recording data. Due to the different azimuth angles, recording data recorded in a helical recording track by the magnetic head A can be reproduced only by the magnetic head A.

The recording means of the known video recorder is adapted to record recording data in helical recording tracks on a magnetic tape, a part of the recording data being formed by information data containing in additional information formed by MPEG transport stream packets. MPEG transport stream packets contain additional information received by the receiving means being inserted directly as information data in recording data to be recorded, as a result of which, information data are recorded in a plurality of recording areas which differ as regards their positions in a helical recording track. The position of a recording area containing information data therefore depends, basically, on the instant at which an MPEG transport stream packet containing additional information appears in the receiving data.

In order to reproduce recorded recording data, the known video recorder comprises reproducing means which includes the two magnetic heads A and B. The reproducing means reproduces recorded recording data with a normal reproducing speed, the transport speed of the magnetic tape during reproduction being the same as during the recording of recording data, and a helical reproducing track which is scanned by a magnetic head A or B covering only one helical recording track. The reproducing means also reproduces recording data at a multiple reproducing speed which is not more than 24 times as high (N=24), the transport of the magnetic tape being effected at a multiple not greater than 24 times the speed used for the recording of recording data, and a helical reproducing track scanned by a magnetic head A or B partly covering a maximum of 24 helical recording tracks at a time. In the case of a 24-fold reproducing speed, the magnetic head A or B scans 24 recording areas of 24 helical recording tracks then traversed. Due to the azimuth angle of the magnetic head A or B by which scanning is effected, recording data, which have been recorded for reproduction at the 24-fold reproducing speed, can be reproduced from 12 associated recording areas which differ as regards their positions in a helical recording track, so-called trick-play recording areas.

With the know video recorder, it has been found that information data recorded in recording areas which differ as regards their positions in helical recording tracks can be reproduced during reproduction of recording data at the normal reproducing speed. However, it has also been found that such information data are hardly ever reproducible during reproduction at a multiple reproducing speed. This is because a helical reproducing track traversed by a magnetic head A or B at a multiple reproducing speed nearly always scans other recording areas than the recording areas in which the information data are stored and whose positions in a helical recording track depend essentially on the instant at which an MPEG transport stream packet containing additional information appears in the receiving data.

SUMMARY OF THE INVENTION

It is an object of the invention to solve the aforementioned problems and to provide an improved recording device of the type defined in the opening paragraph. In a recording device of the type defined in the opening paragraph, this object is achieved in that detection means is provided for detecting additional information contained in reception data and for supplying received detected additional information, and in that additional information processing means is provided for processing received detected additional information and for supplying information data, and in that the recording means is adapted to record the information data supplied by the additional information processing means in an information data recording area which is always the same as regards its position in a helical recording track. This yields the advantage that information data, contained in receiving data and recorded in the information data recording areas, can be reproduced by a reproducing device both during a reproduction mode, in which the transport of the magnetic tape is effected with the normal reproducing speed, and during a reproduction mode, in which the transport of the magnetic tape is effected at a multiple reproducing speed. As a result of this, additional information, for example, the title or content of a television program, can also be reproduced together with picture and sound information at a multiple, for example, the 24-fold, reproducing speed. However, it is particularly advantageous that information data recorded in the information data recording areas can also be reproduced at particularly high reproducing speeds, such as, for example, the 96-fold reproducing speed.

It is to be noted that when, with the known video recorder, information data are recorded in trick play recording areas for reproduction at, for example, a 24-fold reproducing speed, as explained hereinbefore, these can be reproduced only at the 24-fold reproducing speed. Therefore, the information data must be recorded additionally for any multiple reproducing speed desired during subsequent reproduction, which is a substantial drawback. Furthermore, information data can be reproduced at a 24-fold reproducing speed at the most, which is also a substantial drawback.

In a recording device as defined above, it has proven to be advantageous that selection means is provided for selecting received detected additional information and for supplying selected additional information to the additional information processing means. This has the advantage that only additional information selected in accordance with given criteria is recorded as information data in information data recording areas. Such criteria can be stored, for example, in the selection means during the manufacture of the recording device.

In a recording device as defined above, it has proven to be advantageous that the selection means is adapted to select received detected additional information in dependence upon selection information applied to the selection means, and to supply selected additional information to the additional information processing means. This has the advantage that the selection means can use selection criteria which are defined by a user or which are dependent on the mode of operation of the recording device.

In a recording device as defined above, it has proven to be advantageous that the recording means is adapted to record the information data supplied by the additional information processing means in the information data recording area of each helical recording track. This has the advantage that information data can be reproduced continuously during a reproducing process and additional information contained in the information data can be detected very rapidly.

In a recording device as defined above, it has proven to be advantageous that the detection means is adapted to detect additional information contained in a Selection Information Table in reception data in accordance with the DVB standard. This has the advantage that additional information can be determined from receiving data in a particularly reliable manner.

In a recording device as defined above, it has proven to be advantageous that the at least two magnetic heads have Z different azimuth angles, and that reproducing means is provided for reproducing information data recorded in information data recording areas at a maximum N-fold reproducing speed, each of the at least two magnetic heads being capable of scanning a helical reproducing track which traverses N helical recording tracks. This has the advantage that information data recorded in information data recording areas by the recording device can be reproduced by the reproducing means of the recording device at an N-fold reproducing speed at the most.

In such a recording device, it has proven to be advantageous that partitioning means is provided for partitioning additional data which contain additional information into $K=(N*Z)-1$ partitions of information data which can each be recorded in an information data recording area, and that the recording means is adapted to at least K times record the K partitions of information data, which can each be recorded in an information data recording area of a helical recording track, in total in at least $K*K$ information data recording areas of at least $K*K$ helical recording tracks. This has the advantage that all the information data forming additional data can be reproduced at a plurality of reproducing speeds up to the N-fold reproducing speed at the most, but that at low reproducing speeds, it is not necessary to reproduce information data from all the $K*K$ helical recording tracks in order to reproduce all the additional data. For example, at the normal reproducing speed, only K information data from K helical recording tracks must be reproduced in order to reproduce all the information data forming additional data.

In such a recording device, it has proven to be advantageous that the partitioning means is adapted to define the value N of the maximum N-fold reproducing speed as the least common multiple of all the values X of X-fold reproducing speeds envisaged for reproduction. A user of the recording and reproducing device can then specify that information data containing additional information of a television program to be recorded, should be reproducible at a 2-fold, a 4-fold and a 12-fold reproducing speed in a reproducing process after the recording. The least common multiple of the values (x=2, X=4, X=12) is the value "12", for which reason the partitioning means are adapted to set the value N=12. This has the advantage that optimum values N and K can be determined, which enable recorded information data to be reproduced very rapidly at least at all the preset and, if applicable, also any further X-fold reproducing speeds. In the example given above, information data can also be reproduced at a 3-fold and a 6-fold reproducing speed.

In such a recording device, it has proven to be advantageous that the partitioning means is adapted to generate partitioning identification data which identify the partitioning of the additional data into a plurality of K partitions of information data, that the recording means is adapted to record partitioning identification data together with associated information data, and that allocation means is adapted to allocate, during reproduction, reproduced partitioned information data in accordance with concurrently reproduced partitioning identification data so as to obtain reproduced additional data. This has the advantage that a reconstruction of the reproduced information data in order to restore the additional data partitioned prior to recording by the recording means is possible in particularly simple manner.

BRIEF DESCRIPTION OF THE DRAWINGS

An embodiment of the invention will be described in more detail, by way of example, with reference to the accompanying drawings, in which:

FIGS. 3A–3F show an Information Data Table with the aid of which the reproduction of information data forming partitioned additional data recorded in information data recording areas at a plurality of reproducing speeds with a maximum 6-fold reproducing speed (N=6) can be explained.

DESCRIPTION OF THE PREFERRED EMBODIMENTS

Figure 1:
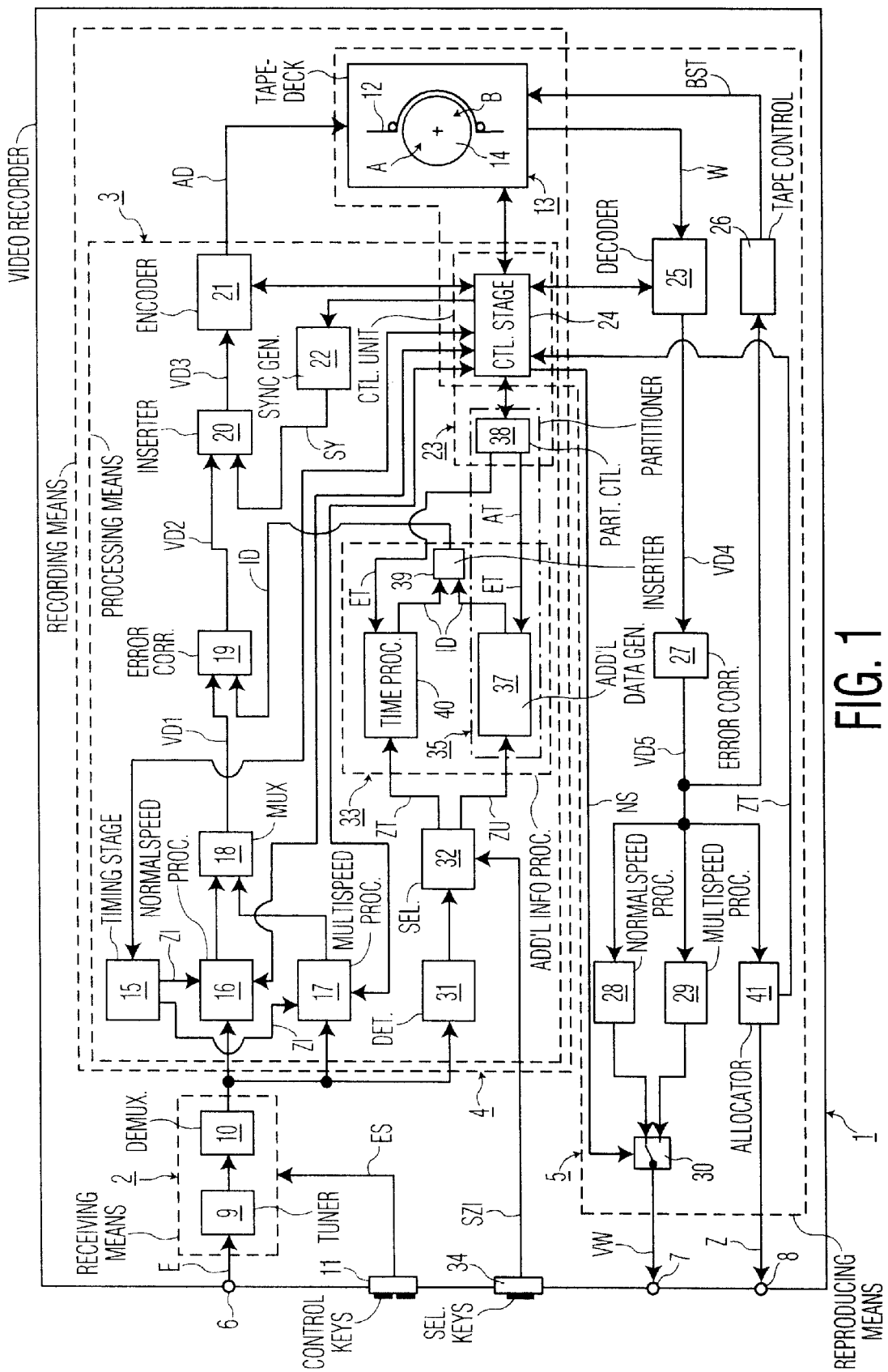
FIG. 1 is block diagram which diagrammatically shows a video recorder having detection means for the detection of additional information contained in receiving data, and having partitioning means for partitioning detected additional data containing additional information into K=(N*Z)−1 information data partitions which can each be recorded in an information data recording area.

FIG. 1 shows a recording and reproducing device formed by a video recorder 1. The video recorder 1 comprises receiving means 2, processing means 3, recording means 4, which include the processing means 3, and reproducing means 5. Digital reception data E containing picture, sound and additional information are applied to an input terminal 6 of the video recorder 1. The video recorder 1 supplies reproduction data VW, reproduced and processed by the reproducing means 5 and containing picture, sound and additional information at an output terminal 7. Information data forming additional data Z reproduced from information data recording areas is supplied to an additional information output terminal 8, which will be described in more detail hereinafter.

Digital reception data E applied to the input terminal 6 is supplied to the receiving means 2. Digital reception data E then form a so-called DVB information packet stream in accordance with the International DVB standard (Digital Video Broadcast, ETSI, TM1217 Rev. of Feb. 6, 1998). Such a DVB information packet stream comprises an MPEG transport stream in accordance with the MPEG standard (ISO/IEC 11171-1 and ISO/IEC 13.818-1). An MPEG transport stream comprises MPEG transport stream packets having a length of 188 bytes. Each MPEG transport stream packet has a header area and an information area. An information area contains encoded digital data representing sound, picture or additional information. Each header area of an MPEG transport stream packet inter alia accommodates a packet stream identification (PID). MPEG transport stream packets containing picture information of a television program, have a common packet stream identification and form a first sub-stream of an MPEG transport stream. MPEG transport stream packets containing sound information of this television program, have another packet stream identification and form a second sub-stream in the MPEG transport stream. The sub-streams associated with a television program form a program stream. In this way, a plurality of sub-streams can be accommodated in an MPEG transport stream, the MPEG transport stream packets of each sub-stream having an individual program stream identification.

An MPEG transport stream further includes further table information in further MPEG transport stream packets. A Program Association Table (PAT), a Program Map Table (PMT) and a Selection Information Table (SIT) will now be described in more detail. A Program Association Table contains information about how many program streams are transmitted in the MPEG transport stream. For each program stream listed in a Program Association Table, a Program Map Table is transmitted which specifies the sub-streams associated with the program stream and identified by their program stream identifications in the Program Map Table.

A Selection Information Table contains additional information relating to television programs transmitted in program streams of an MPEG transport stream. Additional information can, for example, be information that a television program can be displayed in the 16:9 display format, or that sound information of a television program supports "Surround Sound". However, additional information can also be a title of a television program or a summary of the content of a television program. MPEG transport stream packets including a Selection Information Table always have the same packet stream identification PID="1Fhex".

The receiving means 2 comprises a digital tuner 9 and a demultiplexer 10. Receiving means control keys 11, also known as channel UP/DOWN keys, apply a reception control signal ES to the receiving means 2. By actuation of the receiving means control keys 11, a user of the video recorder 1 can select an MPEG transport stream comprising, for example, six program streams of six television programs and having a data rate of 14 MB/s from a DVB information packet stream formed by digital reception data and having a data rate of 38 MB/s.

An MPEG transport stream supplied by the receiving means 2 is applied to the recording means 4 in order to record recording data AD containing the MPEG transport stream. The recording means 4 records recording data AD in helical recording tracks S, in accordance with a DVHS standard (Victor Company of Japan, No. 07015 of Jul. 25, 1997), on a magnetic tape 12 of a magnetic-tape cassette. For this purpose, the recording means 4 comprises a tape-deck stage 13 which forms a recording stage and which comprises two magnetic heads mounted on a rotatably-supported head disc 14. A magnetic head A has an azimuth angle of +30° and a magnetic head B has an azimuth angle of −30°. Thus, the recording means 4 includes magnetic heads A and B having a number of Z=2 different azimuth angles. The magnetic heads A and B of the tape-deck stage 13 record recording data AD in helical recording tracks S on the magnetic tape 12 shown in FIG. 2.

Figure 2:
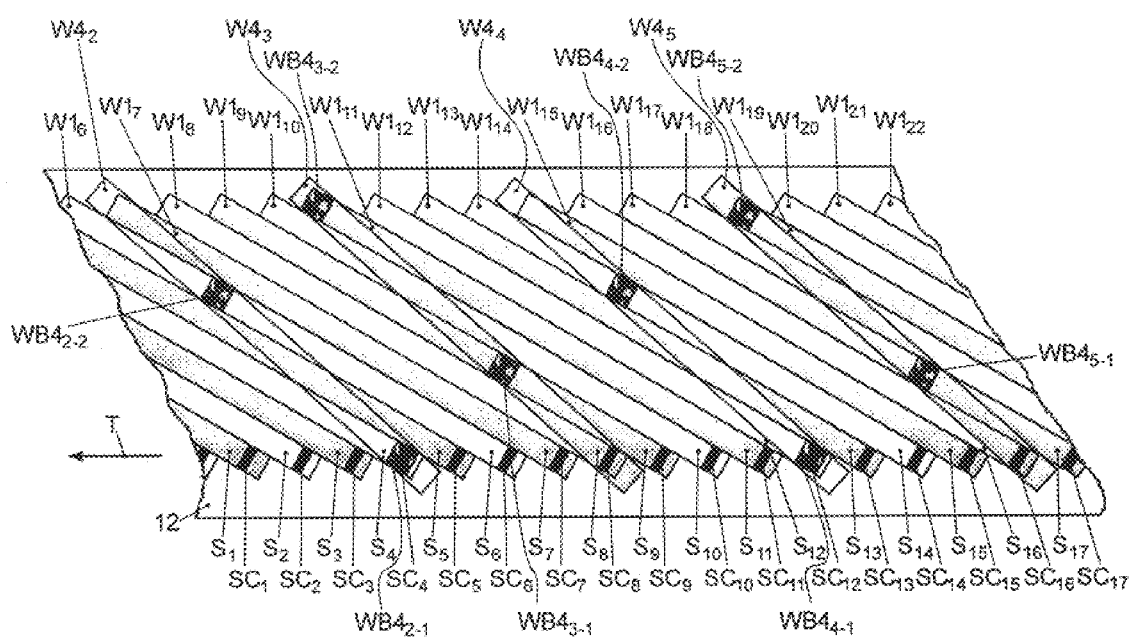
FIG. 2 shows, diagrammatically, a magnetic tape of a magnetic-tape cassette which can be loaded into the video recorder, on which tape, recording data have been recorded in helical recording tracks and which can be scanned by magnetic heads of the video recorder along helical reproducing tracks.

A track pattern formed by helical recording tracks S, shown in FIG. 2, in which recording data AD have been recorded on the magnetic tape 12, will be described hereinafter. FIG. 2 shows a part of the magnetic tape 12 which is moved with a recording speed in a transport direction T during a recording of recording data AD. The magnetic tape 12 is then moved past the magnetic heads and B carried by the rotatably-supported head disc 14, the magnetic head A following helical recording tracks $S_1, S_3, S_5, \ldots, S_{17}$ and the magnetic head B following helical recording tracks $S_2, S_4, S_6, \ldots, S_{16}$. During a recording of recording data AD the magnetic heads A and B record recording data AD, in helical recording tracks S thus followed. During a subsequent reproduction recording data AD recorded by the magnetic head A in one of the $S_1, S_3, S_5, \ldots, S_{17}$ can only be reproduced as reproduction data W by the magnetic head A due to the different azimuth angles of the magnetic heads A and B. The provision of different azimuth angles for the magnetic heads A and B reduces crosstalk from recording data AD recorded in adjacent helical recording tracks S during a reproduction of the recording data AD.

The recording means 4 records recording data AD in accordance with the DVHS standard. A given type of recording data AD is then recorded in given recording areas of each helical recording track S, a so-called sub-code recording area SC and a main code recording area being described in more detail hereinafter.

In each helical recording track S, the recording means 4 records a part of the recording data AD as information data ID in an information data recording area formed by the sub-code recording area SC, which is always the same in respect of its position in a helical recording track S. In each of the sub-code recording areas $SC_1, SC_2, \ldots, SC_{17}$ shown in FIG. 2, information data ID is recorded in, each time, four so-called pack data groups. Each packet data group has a header area and a packet data area. The pack data area contains information data ID in three sets of pack data, each having six bytes. The type of information data ID contained in the pack data of a pack data group is identified by a so-called pack data identification contained in the header area of a pack data group. The DVHS standard specifies several types of pack data and associated pack data identifications. For example, one type of pack data contains a cassette number of a magnetic-tape cassette, on which the video recorder 1 has recorded recording data AD, as information data ID. Another type of pack data contains a source code, which identifies a television station whose television program has been recorded by the video recorder 1, as information data ID. A further type of pack data, so-called text pack data, contains text data, as, for example, a title of a television program recorded by the video recorder 1 and formed by so-called ASCII codes, as information data ID. Likewise, a type of time code pack data is specified which can store, for example, the total duration of a television program, the residual duration of a television program and further time data ZT, as information data ID. With respect to such time code pack data, the DVHS standard further specifies that this data is recorded in at least every second helical recording track S so as to enable the current time data ZT to be displayed continuously during reproduction of the information data ID.

In the main code recording area of a helical recording track S, which area has a length which is nearly equal to the total length of the helical recording track S, 336 so-called sync blocks can be recorded, these blocks each having a header recording area and an information area. After processing in the processing means 3, which will be described in more detail hereinafter, an MPEG transport stream packet received by the receiving means 2, together with timing information ZI necessary for the correctly timed reproduction, is basically recorded in, each time, two sync blocks. MPEG transport stream packets contained in receiving data are basically recorded in sync blocks of the main code recording area on the magnetic tape 12 in the sequence in which they are received from the receiving means 2. Thus, it is also possible to record additional information, formed by a Selection Information Table and contained in one or more MPEG transport stream packets of the receiving data E, as information data ID in recording areas of the main code recording area which differ as regards their positions in a helical recording track S. The position of a recording area in the main code recording area of a helical recording track S, in which information data ID containing additional information have been recorded, therefore, essentially depends on when a Selection Information Table appears in the receiving data. Consequently, the recording means 4 can record information data ID in a plurality of at least two recording areas of the main code recording area which differ as regards their positions in a helical recording track S. A reproduction of such information data ID recorded in a main code recording area is substantially impossible in a so-called trick-play reproducing mode, in which the magnetic tape 12 is moved at a multiple of the reproducing speed, as will be described in more detail hereinafter.

The reproducing means 5 reproduces recording data AD, recorded on the magnetic tape 12 of a magnetic-tape cassette, at a normal reproducing speed and, at most, at an N-fold multiple reproducing speed. During reproduction at a normal reproducing speed, the magnetic tape 12 is moved in the transport direction T at a normal reproducing speed which corresponds to the recording speed during the recording of recording data AD. The magnetic head A then scans the magnetic tape 12 along helical reproducing tracks $W1_9 \ldots, W1_{21}$ and the magnetic head B scans the magnetic tape 12 along helical reproducing tracks $W1_6, W1_8 \ldots, W1_{22}$, a helical reproducing track W1 exactly coinciding with a helical recording track S. When the transport of the magnetic tape 12 is effected with the normal reproducing speed, all recording data recorded in arbitrary helical recording tracks S, and also all recording data AD recorded as information data ID can be reproduced as reproducing data W.

During reproduction at a multiple reproducing speed, the magnetic tape 12 is moved in the transport direction T with a corresponding multiple reproducing speed which corresponds to a multiple of the recording speed during the recording of recording data AD. Thus, the magnetic tape 12 is moved, for example, with 4 times the recording speed during reproduction with the 4-fold reproducing speed. The magnetic head A then scans the magnetic tape 12 along helical reproducing tracks $W4_3$ and $W4_5$ and the magnetic head B scans the magnetic tape 12 along helical reproducing tracks $W4_2$ and $W4_4$, each of the magnetic heads A and B enabling a helical reproducing track W4 to be scanned which traverses for helical recording tracks S. During a reproduction with the 4-fold reproducing speed, recording data AD can be reproduced from the recording areas WB4 shown in FIG. 2. For example, the magnetic head A, which scans the magnetic tape 12 along the helical reproducing track $W4_3$, can reproduce recording data AD recorded by the magnetic head A in the helical recording track $S_9$, in the reproducing area $WB4_{3-1}$, and recorded by the magnetic head A in the helical recording track $S_{11}$, in the reproducing area $WB4_{3-2}$. Due to the different azimuth angles of the magnetic heads A and B, the magnetic head A cannot reproduce any recording data AD from the helical recording tracks $S_8$ and $S_{10}$, traversed by the helical reproducing track $W4_3$ at the four-fold reproducing speed, in which helical recording tracks recording data AD have been recorded by the magnetic head B.

In order to enable a reproduction of picture, sound and additional information at a multiple reproducing speed picture, so-called trick-play data containing picture sound and additional information are recorded in trick-play recording areas formed by a plurality of sync blocks in the main code recording area. Trick-play recording areas for reproduction at, for example, the four-fold reproducing speed are chosen to be similar to the reproducing areas WB4 from which recording data AD can be reproduced at the four-fold reproducing speed. Thus, MPEG transport stream packets with picture, sound and additional information are recorded in sync blocks of the main code recording area not only for reproduction at the normal reproducing speed, but a part or all of these MPEG transport stream packets are also recorded in the trick-play recording areas of the main code recording area for reproduction at a 4-fold reproducing speed. As is apparent from the track pattern shown in FIG.

2, all the reproducing areas WB4 can be reproduced only at the 4-fold reproducing speed. Therefore, during recording of recording data AD, further trick-play data should, in addition, be recorded in further trick-play recording areas of the main code recording area for each multiple reproducing speed envisaged for subsequent reproduction. Such a track pattern with trick-play recording areas for a plurality of reproducing speeds is known from International Patent Application No. PCT/IB 98/00130, which is herewith incorporated by reference.

Now the structure of the recording means 4 of the video recorder 1 shown in FIG. 1 will be described in more detail hereinafter. The processing means 3, included in the recording means 4, includes a timing stage 15, normal-speed recording processing means 16, multiple-speed recording processing means 17, a multiplexer 18, first error correction means 19, first insertion means 20, channel encoding means 21, a sync generator 22, and a control stage 24 provided in a control unit 23. An MPEG transport stream supplied by the receiving means 2 is applied to the normal-speed recording processing means 16 and the multiple-speed recording processing means 17. Furthermore, the timing stage 15 applies timing information ZI to the normal-speed recording processing means 16 and to the multiple-speed recording processing means 17. In the normal-speed recording processing means 16 and in the multiple-speed recording processing means 17, timing information ZI is attached to each MPEG transport stream packet to be recorded, this timing information marking the time of arrival of the MPEG transport stream packet and, as already explained hereinbefore, is recorded on the magnetic tape 12 together with the MPEG transport stream packet.

In the video recorder 1, in a manner not shown, a user of the video recorder 1 can predefine, prior to the recording of a television program, at which multiple recording speeds the recorded television program should subsequently be reproducible. A user of the video recorder 1 can thus specify, prior to the recording of a television program, that this television program is to be recorded in such a manner that reproduction of the television program is possible at a 2-fold reproducing speed, a 3-fold reproducing speed, a 6-fold reproducing speed and a 12-fold reproducing speed. To this end, the user can, for example, preset a value N=12, which specifies the maximum reproducing speed. The multiple-speed recording processing means 17 then selects MPEG transport stream packets containing picture, sound and additional information from the MPEG transport stream packets supplied by the receiving means 2 so as to allow these MPEG transport stream packets to be recorded as trick-play data in trick-play recording areas of the main code recording area.

The normal-speed recording processing means 16 and the multiple-speed recording processing means 17 are further adapted to attach identification information to each supplied MPEG transport stream packet, in order to specify whether recording in a sync block with the normal or multiple reproducing speed is envisaged. Normal-speed recording processing means and multiple-speed recording processing means are also known from International Patent Application No. PCT/IB 98/00130, which is herewith incorporated by reference.

MPEG transport stream packets processed by the normal-speed recording processing means 16 and the multiple-speed recording processing means 17, together with the associated timing information ZI, are supplied to the multiplexer 18. The multiplexer 18 inserts the processed MPEG transport stream packets applied to it, including the associated timing information ZI, into a first processing data stream VD1 in a time-shifted manner.

A first processing data stream VD1 supplied by the multiplexer 18 is applied to the first error correction means 19. As will be explained hereinafter, information data ID to be recorded in subcode recording areas SC, can also be applied to the first error correction means 19. The first error correction means 19 generates and inserts redundancy information about the applied data, and supplies a second processing data stream VD2 containing the redundancy information to the first insertion means 20.

Furthermore, synchronizing information SY from the sync generator 22 is applied to the first insertion means 20. Synchronizing information SY is formed by a given sequence of bits specified in the DVHS standard. Synchronizing information SY marks the beginning of a sync block. The first insertion means 20 supplies a third processing data stream VD3 to the channel encoding means 21.

The channel encoding means 21 encodes an applied third processing data stream VD3 in accordance with an encoding method, and supplies recording data AD to the tape-deck stage 13.

The control stage 24 of the control unit 23 has control and data lines to the timing stage 15, the normal-speed recording processing means 16, the multiple-speed recording processing means 17, the channel encoding means 21, the sync generator 22 and the tape-deck stage 13, and controls the recording of recording data AD on the magnetic tape 12. Such a control stage is also known from International Patent Application No. PCT/IB 98/00130, which is herewith incorporated by reference.

Hereinafter, the structure of the reproducing means 5 of the video recorder 1 shown in FIG. 1 is described. The reproducing means 5 includes channel decoding means 25, tape control means 26, second error correction means 27, normal-speed reproduction processing means 28, multiple-speed reproduction processing means 29, and a switch 30. The reproducing means 5 further comprises the control stage 24 of the control unit 23, also included in the recording means 4, and the tape-deck stage 13, which now forms a reproducing stage. During reproduction process in which the magnetic tape 12 is moved at a normal or a multiple reproducing speed, the tape-deck stage 13 supplies reproducing data W to the channel decoding means 25. The channel decoding means 25 decodes the reproducing data W in accordance with a decoding method which is the inverse of the encoding method. The channel decoding means 25 applies decoded reproducing data to the second error correction means 27 as a fourth processing data stream VD4.

The second error correction means 27 corrects recording or reproducing errors in the reproducing data W with the aid of the redundancy information inserted into the second processing data stream VDS by the first error correction means 19 and contained in the fourth processing data stream VD4. These errors can arise, for example, as a result of material flaws in the magnetic tape 12 or a soiled magnetic head A or B. The second error correction means 27 supplies a fifth processing data stream VD5 to the tape control means 26.

The tape control means 26 evaluates the fifth processing data stream VD5, generates tape control information BST, and supplies this tape control information BST to the reproducing stage formed by the tape-deck stage 13. During a reproduction of reproducing data W, during which the magnetic tape 12 is moved with a normal reproducing speed, the tape-deck stage 13 changes the speed of transport of the magnetic tape 12 briefly to a small extent in response to tape control information BST in order to achieve that a helical reproducing track W1 of the magnetic head A keeps in track with a helical recording track S recorded by the magnetic head A, as has been explained with reference to FIG. 2. During a reproduction of reproducing data W, during which the magnetic tape 12 is moved with a multiple reproducing speed, the tape-deck stage 13 changes the speed of transport of the magnetic tape 12 briefly to a small extent in response, to tape control information BST in order to achieve that the respective magnetic head A or B scans the reproducing areas WB, as has been explained with reference to FIG. 2.

In a manner not shown, the user of the video recorder can start a reproduction of recording data AD recorded on the magnetic tape 12, during which reproduction, the magnetic tape 12 is moved with a normal reproducing speed. However, the user can also start a so-called trick-play reproduction for which the magnetic tape 12 is moved with a multiple reproducing speed which has been preset by the user prior to the recording of the recording data AD, as explained hereinbefore. The control stage 24 then controls the tape-deck stage 13 accordingly, inter alia, so as to move the magnetic tape 12 with the appropriate reproducing speed. The control unit 24 further supplies normal-speed control information NS to the switch 30 when the user has activated reproduction at the normal reproducing speed. The second error correction means 27 supplies the fifth processing data stream VD5 to the normal-speed reproduction processing means 28 and the multi-speed reproduction processing means 29.

The normal-speed reproduction processing means 28 evaluates the identification information of the sync blocks recorded on the magnetic tape 12 which have been identified by the normal-speed recording processing means 16. The normal-speed reproduction processing means 28 further supplies MPEG transport stream packets contained in said identified sync blocks to the switch 30 in accordance with the timing information ZI attached to them by the normal-speed recording processing means 16.

The multi-speed reproduction processing means 29 evaluates the identification information of the sync blocks recorded on the magnetic tape 12 which have been identified by the multi-speed recording processing means 17. The multi-speed reproduction processing means 29 further supplies MPEG transport stream packets contained in these identified sync blocks to the switch 30 in accordance with the timing information ZI added to them by the multi-speed recording processing means 17.

When the user of the video recorder 1 has started a reproduction with the normal reproducing speed, the control stage 24 supplies normal-speed control information NS to the switch 30, upon which the MPEG transport stream packets supplied by the normal-speed reproduction processing means 28 are applied to the output terminal 7 as processed reproducing data VW. Conversely, when the user of the video recorder 1 has started a reproduction with a multiple reproducing speed, the control stage 24 does not supply normal-speed control information NS to the switch 30, upon which the MPEG transport stream packets supplied by the multi-speed reproduction processing means 29 are applied to the output terminal 7 as processed reproducing data VW. Such reproducing means 5 is known from, for example, International Patent Application No. PCT/IB 98/00130, which is which is incorporated herewith by reference.

As already explained hereinbefore, picture, sound and additional information of a television program should also be recorded as trick-play data in trick-play recording areas to enable subsequent trick-play reproduction of this recorded television program at a plurality of different multiple reproducing speeds. Trick-play data recorded in trick-play recording areas can only be reproduced completely at one of the multiple reproducing speeds. In order to enable a reproduction of additional information, such as, for example, the title of a television program, even at very high multiple reproducing speeds, the video recorder 1 now includes detection means 31 for the detection of additional information contained in reception data E and to supply received detected additional information. For this purpose, an MPEG transport stream supplied by the receiving means 2 is applied to the detection means 31. The detection means 31 detects MPEG transport stream packets in the MPEG transport stream, which packets are identified by a packet stream identification PID="1Fhex" and contain a Selection Information Table. The detection means 31 supplies MPEG transport stream packets containing a Selection Information Table to the selection means 32.

The selection means 32 selects received detected additional information contained in a Selection Information Table, and applies selected additional information to additional information processing means 33. The video recorder 1 has a selection key 34 for supplying selection information SZI to the selection means 32. By actuation of the selection key 34, the user can select given items of additional information from the additional information in the Selection Information Table, in a manner not shown in FIG. 1, for recording on the magnetic tape 12. The user of the video recorder 1 can choose, for example, whether the summary of the content of a television program to be recorded should be recorded on the magnetic tape 12 as additional information.

A Selection Information Table identifies each type of additional information by means of a "descriptor". By evaluation of the corresponding descriptors of a Selection Information Table, the selection means supplies additional information contained in the Selection Information Table as time data ZT or content data ZU. Time data ZT, for example, provides information about the total duration of a received television program or about the residual duration of a received television program. Content data ZU contains, for example, the title of a television program or a source code which identifies a television station from which a television program is received.

The video recorder 1 further comprises partitioning means 35 for partitioning additional data into a number of K=(N*Z)−1 partitions of information data ID, these partitions each being recorded in an information data recording area formed by a sub-code recording area SC. As explained hereinbefore, the value N defines the maximum reproducing speed for trick-play reproduction, and the value Z defines the number of different azimuth angles of magnetic heads by means of which recording data are recorded in helical recording tracks S. In the video recorder 1, the magnetic head A has a different azimuth angle than the magnetic head B, so that the value Z=2. The partitioning of additional data formed by content data ZU, which cannot be recorded in a sub-code recording area SC because they require much storage space, into K partitions of information data ID which can each be recorded into a sub-code recording area SC, will be described hereinafter with reference to FIGS. 3A–3F, which shows an Information Data Table 36.

In order to partition additional data, the partitioning means 35 includes an additional data generator 37 and a partitioning control stage provided in the control unit 23. For this purpose, the partitioning control stage 38 is connected to the control stage 24 and the additional data generator 37.

The partitioning means 35 partitions content data ZU into partitions of information data ID which can each be recorded into a sub-code recording area SC. The partitioning control stage 38 of the partitioning means 35 generates partitioning identification data AT which identify the partitioning of the content data ZU into a plurality of K partitions of information data ID, and supplies generated partitioning identification data AT to the additional data generator 37. Information data ID partitioned by the partitioning means 35, together with associated partitioning identification data AT, which can, each time, be recorded together in a sub-code recording area SC, are applied from the partitioning means 35 to second insertion means 39 as information data ID.

The additional information processing means 33 includes a time information processing stage 40 to which time data ZT is applied by the selection means 32. The time information processing stage 40 updates time data ZT stored in the time information processing stage 40. Thus, it is possible, for example, to adjust a recording time of a television program, this time having already elapsed and having been determined by means of a tape transport counter, not shown in FIG. 1, with the aid of time data ZT, upon which the tape transport counter determines the subsequent recording time on the basis of the adjusted value of the recording time. Periodically updated time data ZT stored in the time information processing stage 40 is supplied to the second insertion means 39 as information data ID which is recorded in a sub-code recording area of a helical recording track S.

The partitioning control stage 38 is connected to the additional data generator 37 and to the time information processing stage 40 and supplies insertion control information ET, the additional data generator 37 and the time information processing stage 40 applying information data ID to the second insertion means 39 upon the occurrence of insertion control information ET. The partitioning control stage 38 periodically supplies insertion control information ET to the time information processing stage 40 in order to guarantee a recording of information data ID containing time data ZT in time code pack data of at least every second helical recording track S, as prescribed by the DVHS standard and explained hereinbefore. When the partitioning control stage 38 does not supply insertion control information ET to the time information processing stage 40, the partitioning control stage 38 supplies insertion control information ET to the additional data generator 37 in order to initiate a recording of information data ID containing content data ZU in previously mentioned text pack data.

The second insertion stage 39 inserts information data ID into the pack data area of a pack data group, and identifies the type of pack data by means of a pack data identification included in the header area of a pack data group. The insertion means 39 further supplies pack data groups as information data ID to the first error correction means 19, which inserts the information data ID into the second processing data stream VD2, as described hereinbefore. The recording means 4 records information data ID together with associated partitioning identification data AT in sub-code recording areas SC on the magnetic tape 12.

Information data ID and associated partitioning identification data AT recorded on the magnetic tape 12 in sub-code recording areas SC can be reproduced as reproduction data W in a reproduction mode at the normal reproducing speed and in a trick-play reproduction mode, which will be described hereinafter with reference to the Information Data Table 36 shown in FIGS. 3A–3F. A fifth processing data stream VD5 containing reproduced information data ID and associated partitioning identification data AT can be applied to allocation means 41 by the second error correction means 27.

The allocation means 41 allocates, during reproduction, reproduced information data ID, partitioned by the partitioning means 35 during recording, in accordance with partitioning identification data AT reproduced together with the reproduced information data ID so as to obtain reproduced additional data. Thus, for example, a summary of the content of a television program in the form content data ZU, which, prior to recording, has been partitioned by the partitioning means 35 into K=11 partitions of information data ID which are each recorded in a sub-code recording area SC and has been recorded together with associated partitioning identification data AT, is reconstructed by the allocation means 41 during reproduction by the allocation of reproduced information data ID in accordance with likewise reproduced associated partitioning identification data AT. The allocation means 41 supplies reproduced additional data Z to the additional information output terminal 8. The allocation means 41 further supplies information data containing time data ZT from time code pack data identified in their header area to the control stage 24 for further processing.

The provision of the detection means 31 and of the additional information processing means 33 has the advantage that additional information contained in receiving data E is recorded as information data ID in the information data recording areas and can subsequently be reproduced both at the normal reproducing speed and at a multiple reproducing speed without the need to record the information data ID, in addition, in trick-play recording areas intended for this purpose for each of the given multiple reproducing speeds. Moreover, information data recorded in sub-code recording areas SC can also be edited after the recording, which is also advantageous.

The provision of the selection means 32 has the advantage that the user of the video recorder 1 can select additional information from the additional information contained in reproduction data E, which he/she wishes to record as additional information about a television program.

The partitioning of additional data into partitions of information data ID which can each be recorded in a sub-code recording area SC in order to record said information data ID and the allocation of reproduced information data ID in order to obtain reproduced additional data Z, will be explained hereinafter with reference to the Information Data Table 36 shown in FIGS. 3A to 3F. FIG. 3A shows a first, FIG. 3B shows a second, FIG. 3C shows a third, FIG. 3D shows a fourth, FIG. 3E shows a fifth, and FIG. 3F shows a sixth part of the Information Data Table 36. The first row of the entire Information Data Table 36 consecutively gives the helical recording tracks S1 to S144. The second row of the Information Data Table 36 each time gives the magnetic head H—either the magnetic head A or the magnetic head B—by which the recording data AD containing information data ID have been recorded in the respective helical recording track S. The third row of the Information Data Table 36 gives partitioning identification data AT.

When, for example, prior to the recording of the television program "Casablanca", the user of the video recorder 1 has defined the value of N as N=6 in the manner explained hereinbefore and has thereby defined a maximum 6-fold reproducing speed for a trick-play reproduction subsequent to the recording, the partitioning means 35 determines the value $K=(N*Z)-1=(6*2)-1=11$ because the magnetic heads have Z=2 different azimuth angles. When the user has further made the choice by the entry of selection information SZI that a summary of the content of the television program "Casablanca", contained in the reception data E as additional information, should be recorded as content data ZU, the partitioning means 35 partitions the content data ZU in information data ID. The content data ZU, which cannot be recorded in a pack data group in the sub-code recording area SC of a helical recording track S, are partitioned into a multitude of subsidiary content data, these subsidiary content data being formed into K=11 partitions of information data ID which can each be recorded in a sub-code recording area SC. The first one of the K partitions of information data ID of the first subsidiary content data is given the number "1" as partitioning identification data AT, the second one of the K partitions of information data ID of the first subsidiary content data is given the number "2" as partitioning identification data AT, and so on, until, finally, the eleventh one of the K=11 partitions of information data ID of the first subsidiary content data is given the number "11" as partitioning identification data AT. The first one subsequent K=11 partitions of information data ID of the second subsidiary content data is then given the number "12" as partitioning identification data AT.

The first one of the K partitions of information data ID, together with the associated partitioning identification data AT=1, are recorded in the sub-code recording area SC1 of the helical recording track S1. The subsequent ten partitions of the K=11 partitions of information data ID, together with the associated partitioning identification data AT=2, 3, 4 to 11, are recorded in the sub-code recording areas $SC_2$, $SC_3$, $SC_4$ to $SC_{11}$ of the helical recording tracks $S_2$, $S_3$, $S_4$ to $S_{11}$. The third row gives the associated partitioning identification data AT=1 to AT=11 for recorded information data ID of a sub-code recording area SC.

The recording means 4 is adapted to at least K times record the K partitions of information data ID, which can each be recorded in an information data recording area of a helical recording track S, in total in at least K*K information data recording areas of at least K*K helical recording tracks S. The K=11 partitions of information data ID of the first subsidiary content data are then recorded for the first time in the helical recording tracks $S_1$ to $S_{11}$, for the second time in the helical recording tracks $S_{12}$ to $S_{22}$ and for the K=11th time in the helical recording tracks $S_{111}$ to $S_{121}$, i.e., in total, in K*K=121 sub-code recording areas SC of K*K helical recording tracks S. Starting from the helical recording track $S_{122}$, the information data ID of the second subsidiary content data are recorded.

The reproduction of information data ID recorded in subcode recording areas SC will now be explained hereinafter with reference to the Information Data Table 36 shown in FIGS. 3A–3F. The fourth row of the Information Data Table 36 gives, for each helical recording track S, the magnetic head A or B which scans the respective helical recording track S along a helical reproducing track W1 in a reproduction mode in which the magnetic tape 12 is moved at the normal reproducing speed. A comparison between the magnetic head A or B by which the recording data AD have been recorded in the helical recording track S, this head being given in the second row of the Information Data Table 36, and the magnetic head A or B which scans the respective helical recording track S along a helical reproducing track W1, this head being given in the fourth row of the Information Data Table 36, makes it possible to determine from which information data recording areas of which helical recording track S information data ID can be reproduced. The cells of the Information Data Table 36, for which during recording, the helical recording track S has been scanned by the same magnetic head A or B as during reproduction, have been shaded and indicate that the information data ID in the helical recording track S marked by the partitioning identification data AT can be reproduced. It is apparent from this that all information data ID forming the first subsidiary content data, together with the associated partitioning identification data AT, are reproduced already after K=11 partitions of information data ID have been reproduced from the helical recording tracks $S_1$, to $S_{11}$. With the aid of the partitioning identification data AT, the first subsidiary content data, which contain the first part of the summary of the content of the television film "Casablanca", are reconstructed already of the reproduction of the helical recording tracks $S_1$ to $S_{11}$ and are supplied to the additional information output terminal 8 as additional data Z.

This yields the advantage that during a reproduction at a speed lower than the N-fold reproducing speed, additional data or parts of the additional data are available at the additional information output terminal 8 after only a part of the K partitions of information data ID, which have been recorded K times, has been reproduced by the video recorder 1.

The fifth row of the Information Data Table 36 gives, for each helical recording track S, the magnetic head A or B which scans the respective helical recording track S along a helical reproducing track in a trick-play reproduction mode in which the magnetic tape 12 is moved with a 2-fold reproducing speed. From a comparison between the magnetic head A or B specified in the second and the fifth row of the Information Data Table 36, it follows which information data ID identified by partitioning identification data AT can be reproduced from the sub-code recording areas SC of the helical recording tracks S. The information data ID with the partitioning identification data AT=1 can then be reproduced from the helical recording track $S_1$, the information data ID with the partitioning identification data AT=5 from the helical recording track $S_5$, and, subsequently, the information data ID with the partitioning identification data AT=9, 2, 6, 10, 3, 7, 11, 4 and, finally, the information data ID with the partitioning identification data AT=8 from the helical recording track $S_{41}$. In an advantageous manner, the first part of the summary of the content of the television program "Casablanca" can already be supplied to the additional information output terminal 8 by the allocation means 41 after the reproduction of the first 41 helical recording tracks S.

For each helical recording track S, the sixth row of the Information Data Table 36 gives the magnetic head A or B which scans the information data recording area of the helical recording track S along a helical reproducing track in a trick-play reproduction mode in which the magnetic tape 12 is moved with a 3-fold reproducing speed and the seventh row of the Information Data Table 36 gives the magnetic head A or B which scans the information data recording area in a trick-play reproduction mode in which the magnetic tape 12 is moved with a maximum 6-fold reproducing speed. From a comparison between the magnetic head A or B specified in the second and the sixth row and in the second and the seventh row of the Information Data Table 36, it follows which information data ID identified by partitioning identification data AT can be reproduced from the sub-code recording areas SC of the helical recording tracks S.

At the 3-fold reproducing speed, the information data ID with the partitioning identification data AT=1 can then be reproduced from the helical recording track $S_1$, the information data ID with the partitioning identification data AT=4 from the helical recording track $S_4$, and, subsequently, the information data ID with the partitioning identification data AT=7,10, 2, 5, 8, 11, 3, 6 and, finally, the information data ID with the partitioning identification data AT=9 from the helical recording track $S_{31}$. At the 6-fold reproducing speed, the information data ID with the partitioning identification data AT=1 can then be reproduced from the helical recording track $S_1$, the information data ID with the partitioning identification data AT=2 from the helical recording track $S_{13}$, and, subsequently, the information data ID with the partitioning identification data AT=3, 4, 5, 6, 7, 8, 9, 10 and, finally, the information data ID with the partitioning identification data AT=11 from the helical recording track $S_{121}$.

Therefore, for reproducing recorded additional information, information data ID should suitably be reproduced only in a trick-play reproduction mode at the maximum N-fold reproducing speed from all K*K information data recording areas of K*K helical recording tracks S.

The partitioning means 35 further defines the value N of the maximum N-fold reproducing speed as the least common multiple of all the values X of a plurality of X-fold reproducing speeds envisaged for trick-play reproduction. A user of the video recorder 1 can then specify, prior to a television program, in a manner not shown in FIG. 1, that the recorded television program should be reproducible at a 2-fold (X=2), and a 3-fold (X=3) reproducing speed during subsequent trick-play reproduction. The partitioning means 35 then defines the value N as N=2*3=6 because the value "6" is the least common multiple of the values "2" and "3". This yields the advantage that the partitioning means 35 defines optimum values N and K, which enable a particularly rapid reproduction of recorded information ID at least at all the predefined X-fold reproducing speeds.

The partitioning means 35 further records K partitions of information data ID in, each time, one information data recording area of K successive helical recording tracks S. This yields the advantage that information data ID can be reproduced particularly rapidly in order to obtain additional data in a reproducing mode.

For example, when a user of a video recorder having four magnetic heads with four different azimuth angles (Z=4) specifies X=6 and X=8 as reproducing speeds for trick-play reproduction modes prior to a recording of a television program, this results in N=6*8=24 as the least common multiple of the values "6" and "8" and K=(N*Z)−1=(24*4)−1=95. Information data partitioned and recorded in accordance with the invention can now be reproduced at all X-fold reproducing speeds for which N can be divided by X without a remainder being left. For N=24, these are all the 2, 3, 4, 6, 8, 12, 24-fold reproducing speeds.

It is to be noted that measures in accordance with the invention can also be used in other apparatuses adapted to record and reproduce recording data in helical recording tracks S on a magnetic tape. Such an apparatus can then record recording data, for example, in accordance with the ATSC standard (A/53 (1995), ATSC Digital Television Standard) on a magnetic tape and reproduce recording data which have been recorded on a magnetic tape in accordance with the ATSC standard.

It is to be noted that partitioning means in accordance with the invention may also be adapted to partition additional data in smaller units of information data ID than described hereinbefore, in which case for example three information data partitions identified by three items of partitioning identification data can be recorded together in an information data recording area of a helical recording track.

It is to be noted that information data ID recorded in the sub-code recording areas are also reproducible with a very high—for example, a 96-fold—reproducing speed, picture, sound and additional information recorded in the main code recording area then being reproducible only up to an 48-fold reproducing speed, at most.

It is to be noted that additional information may also include picture or sound information, in which case, additional information can be formed, for example, by an image which is typical of a television program or an audio sequence which is typical of a television program.

It is to be noted that that the detection means may detect additional information not only from the Selection Information Table (SIT) of a DVB information packet stream, but also from other portions of the reproduction data.

It is to be noted that a control unit of a video recorder may also supply selection information to selection means for the selection of received and detected additional information. The control unit may then supply selection information in dependence on the internal processing status of the video recorder.

What is claimed is:

1. A recording device comprising:
   receiving means for receiving digital reception data containing picture, sound and additional information;
   processing means for processing received digital reception data and for supplying digital recording data, a part of the recording data being formed by information data containing the additional information
   recording means, having at least two magnetic heads mounted on a rotatably-supported head disc, for recording the recording data in helical recording tracks on a magnetic tape;
   detection means for detecting the additional information contained in the digital reception data, and for supplying the detected additional information; and
   additional information processing means for processing received detected additional information and for supplying information data,
the recording means recording the information data supplied by the additional information processing means in an information data recording area in the helical recording track, said information data recording area occupying a same position in each helical recording track.

2. The recording device as claimed in claim 1, characterized in that said recording device further comprises selection means for selecting detected additional information and for supplying the selected additional information to the additional information processing means.

3. The recording device as claimed in claim 2, characterized in that the selection means selects detected additional information in dependence upon selection information applied to said selection means, and supplies the selected additional information to the additional information processing means.

4. The recording device as claimed in claim 1, characterized in that the recording means records the information data supplied by the additional information processing means in the information data recording area of each helical recording track.

5. The recording device as claimed in claim 1, characterized in that the additional information detected by the detection means is contained in a selection information table in the reception data in accordance with the DVB Standard.

6. The recording device as claimed in claim 1, characterized in that the at least two magnetic heads have Z different azimuth angles, and in that the recording device further comprises reproducing means for reproducing information data recorded in information data recording areas at a maximum N-fold reproducing speed, said reproducing means comprising said at least two magnetic heads, each of the at least two magnetic heads scanning a helical reproducing track which traverses N helical recording tracks.

7. A recording device as claimed in claim 6, characterized in that said recording device further comprises:

partitioning means for partitioning the additional data containing the additional information into K=(N*Z)−1 partitions of information data, each of said partitions of information data being recordable in an information data recording area, the recording means at least K times recording the K partitions of information data in, in total, at least K * K information data recording areas of at least K * K helical recording tracks.

8. The recording device as claimed in claim 7, characterized in that the partitioning means defines the value N of the maximum N-fold reproducing speed as the least common multiple of all the values X of X-fold reproducing speeds envisaged for reproduction.

9. The recording device as claimed in claim 8, characterized in that the partitioning means generates partitioning identification data identifying the partitioning of the additional data into a plurality of K partitions of information data, the recording means recording partitioning identification data together with associated information data, and the reproducing means further comprises allocation means for allocating, during reproduction, reproduced partitioned information data in accordance with concurrently reproduced partitioning identification data so as to obtain reproduced additional data.

* * * * *